US009080790B2

(12) United States Patent
Nuñez Bootello et al.

(10) Patent No.: US 9,080,790 B2
(45) Date of Patent: Jul. 14, 2015

(54) CONCAVE RECEIVER FOR STIRLING DISH AND METHOD FOR MANUFACTURING THE SAME

(75) Inventors: Juan Pablo Nuñez Bootello, Seville (ES); Cristina Sosa Naranjo, Seville (ES); Carlos Miguel Monne Bailo, Seville (ES); Franciso Moreno Gomez, Seville (ES); Mariano Muñoz Rodriguez, Seville (ES)

(73) Assignee: Abengoa Solar New Technologies, S.A., Seville (ES)

( * ) Notice: Subject to any disclaimer, the term of this patent is extended or adjusted under 35 U.S.C. 154(b) by 230 days.

(21) Appl. No.: 13/701,160

(22) PCT Filed: Jun. 1, 2011

(86) PCT No.: PCT/ES2011/000179
§ 371 (c)(1),
(2), (4) Date: Feb. 4, 2013

(87) PCT Pub. No.: WO2011/151488
PCT Pub. Date: Dec. 8, 2011

(65) Prior Publication Data
US 2013/0125875 A1   May 23, 2013

(30) Foreign Application Priority Data
Jun. 2, 2010  (ES) .................................. 201000730

(51) Int. Cl.
B60K 16/00    (2006.01)
F01B 29/10    (2006.01)
(Continued)

(52) U.S. Cl.
CPC . F24J 2/24 (2013.01); B21D 53/06 (2013.01); F03G 6/068 (2013.01); F24J 2/07 (2013.01);
(Continued)

(58) Field of Classification Search
CPC ................. F24J 2/24; F24J 2/248; F24J 2/07; F03G 6/068; B21D 53/06; Y02E 10/44; Y02E 10/46; Y02E 10/41; Y10T 29/49355; F02G 2254/30
USPC ............ 60/641.8–641.15, 517–526; 126/651, 126/663; 29/890.033
See application file for complete search history.

(56) References Cited

U.S. PATENT DOCUMENTS 4,233,957 A  *  11/1980  Kenny ........................... 126/652
4,475,538 A      10/1984  Percival
(Continued)

FOREIGN PATENT DOCUMENTS

CA         2490207 A1   6/2006
DE         4433203 A1   3/1996
(Continued)

OTHER PUBLICATIONS

ISR for related PCT/ES2011/000179 mailed on Oct. 25, 2011.

Primary Examiner — Hoang Nguyen
(74) Attorney, Agent, or Firm — Kilpatrick Townsend & Stockton LLP

(57) ABSTRACT

Concave receiver for a Stirling dish the main components of which are tubes (which form the surface on which the concentrated solar light beam falls), collectors (welded to the tubes and place the fluid that runs through the tubes in communication with the tanks), tanks (the internal areas of the collectors from which the working gas is distributed to each of the tubes) and cupolas (of which there are two types, that for housing the regenerator and the expansion cupola which is the area where the working gas is at a higher temperature) comprising a series of tubes (10, 11) extending from one collector (2), perpendicular thereto, to the other (2), also perpendicular thereto, and having a straight part (12) running from the inside of each collector (2) to the point where the tube starts to curve and a central part (13) in the shape of an arc of a circumference.

14 Claims, 3 Drawing Sheets

(51) Int. Cl.
  *F24J 2/24* (2006.01)
  *F24J 2/07* (2006.01)
  *B21D 53/06* (2006.01)
  *F03G 6/06* (2006.01)
(52) U.S. Cl.
  CPC ............ *F24J 2/248* (2013.01); *F02G 2254/30* (2013.01); *Y02E 10/41* (2013.01); *Y02E 10/44* (2013.01); *Y02E 10/46* (2013.01); *Y10T 29/49355* (2015.01)

(56) References Cited

U.S. PATENT DOCUMENTS

| | | |
|---|---|---|
| 4,485,803 A | 12/1984 | Wiener |
| 4,602,614 A | 7/1986 | Percival |
| 4,665,700 A | 5/1987 | Bratt |
| 4,911,144 A * | 3/1990 | Godett |
| 5,404,723 A * | 4/1995 | Parker et al. ............... 60/641.15 |
| 6,668,555 B1 | 12/2003 | Moriarty |
| 6,735,946 B1 | 5/2004 | Otting |
| 6,739,136 B2 | 5/2004 | Mehos |
| 6,818,818 B2 | 11/2004 | Bareis |
| 7,263,992 B2 * | 9/2007 | Zhang ........................... 126/651 |
| 2001/0036024 A1 * | 11/2001 | Wood ............................ 359/853 |
| 2002/0059798 A1 | 5/2002 | Mehos |
| 2010/0258112 A1 * | 10/2010 | Viskup et al. ................ 126/645 |
| 2011/0073104 A1 * | 3/2011 | Dopp et al. .................. 126/651 |

FOREIGN PATENT DOCUMENTS

| | | |
|---|---|---|
| DE | 19527272 A1 | 1/1997 |
| EP | 0996821 A1 | 5/2000 |
| EP | 2218978 A1 | 8/2010 |

* cited by examiner

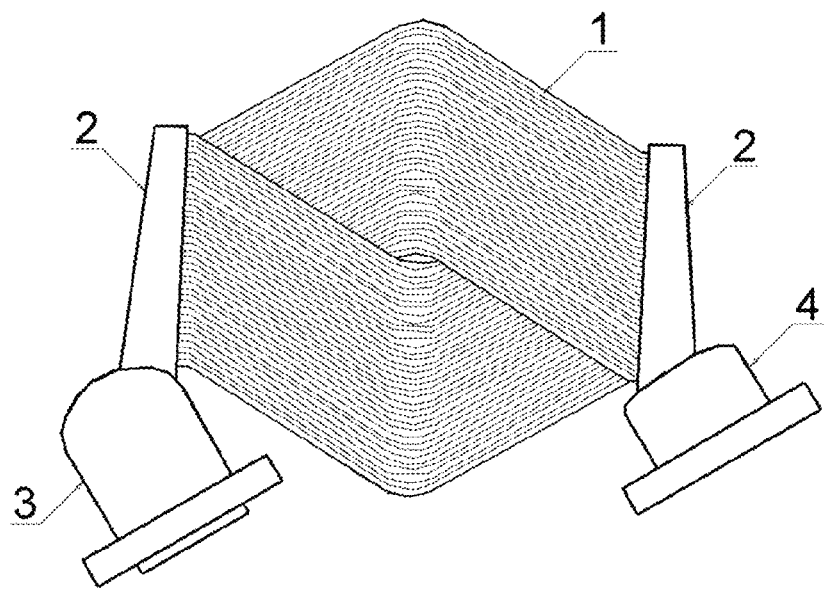
FIGURE 1 (State of the Art. DE19527272)
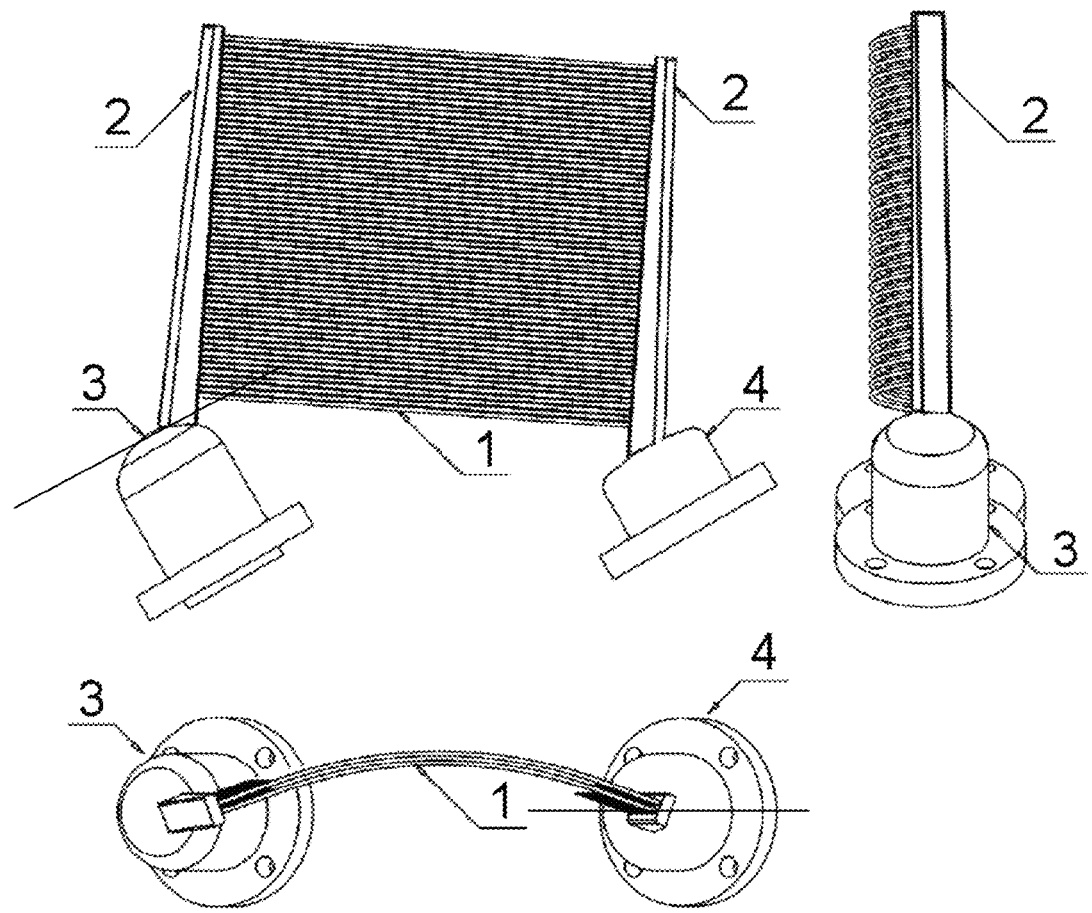
FIGURE 2

CONCAVE RECEIVER FOR STIRLING DISH AND METHOD FOR MANUFACTURING THE SAME

CROSS-REFERENCE TO RELATED APPLICATIONS

This application is the U.S. National Stage of International Patent Application No. PCT/ES2011/000179 filed on Jun. 1, 2011, which claims priority to Spanish Patent Application No. P201000730 filed on Jun. 2, 2010, the disclosures of which are hereby incorporated by reference in their entireties.

TECHNICAL FIELD OF THE INVENTION

The invention is framed within the technology of solar collectors and more specifically it is focused on the design of solar receivers for Stirling dish.

BACKGROUND OF THE INVENTION

The Stirling dish systems are electricity generation units that use solar radiation as a source of energy. The capacity of a single unit is between 3 and 50 kWe.

The Stirling dish systems transform with high efficiency the concentrated solar radiation into electrical energy. The essential components of the system are:
  Parabolic solar concentrator.
  Solar heat exchanger (solar receiver).
  Stirling Engine with electric generator.
  Tracking system.

The mode of operation of a Stirling dish system is the following: the concentrator reflects the solar radiation to the receiver which is located at the focal point of the concentrator. The solar radiation is absorbed in the receiver and this heats the gas (helium or hydrogen) of the Stirling engine at temperatures that are around 650° C. This heat is converted into mechanical energy in the Stirling engine. An electric generator converts this mechanical energy into electricity. So that the reflected radiation strikes the focal point during the entire day, a solar tracking system continually moves the concentrator to follow the path of the sun.

The technology of the solar receivers is developed depending on the type of process in which it will be used, i.e., the type of plant and the cycle used. The invention filed relates to the solar receiver plant with disc and the cycle is Stirling. Of course, it is interesting to know the background and previous developments used in solar applications. The technologies used for solar plants in tower receivers represent a reference application.

In particular, two types of receiver systems are used for the Stirling parabolic dish:
  External receiver systems.
  Cavity receiver systems.

The external receivers have absorption surfaces in direct view with the concentrators and depend on the direct absorption of the radiation. The cavity receivers have, in turn, an opening through which the concentrated radiation passes to reach the surface of the receiver. The cavity ensures that most of the radiation that enters is absorbed by the internal surface of the receiver.

The receivers most widely used for the Stirling dish systems are the cavity receivers. The receiver is located behind the opening to reduce the amount of lost heat and to decrease the intensity of the flow concentrated on its surface. The concentrated radiation that enters through the opening of the receiver is spread inside the cavity. Most of the energy is absorbed directly by the receiver, and virtually all the remaining energy is reflected or irradiated again within the cavity to be absorbed later.

In a cavity receiver, two methods for transferring the solar radiation absorbed to the Stirling engine working fluid have been identified.

The first method consists of using a receiver of directly illuminated tubes where small tubes, through which the work fluid of the engine circulates, are placed directly in the region where the concentrated solar flow strikes. The tubes form the surface of the receiver. In this way the working gas is heated as it passes through the interior of the tubes heated by the solar radiation.

The second method, the reflux method, uses a liquid metal as intermediate heat transfer fluid. The liquid metal is vaporized on the back surface of the receiver and is condensed in the tubes through which the working fluid of the engine circulates. That is, it absorbs the heat from the material that forms the receiver (which is hot by the exposure to solar radiation) and then transfers it to the tubes through which the working gas of the engine circulates. This second type of receiver is called reflux receiver because the steam is condensed and returns to be evaporated again.

An important factor in the design of the receiver is the exposure to severe conditions of operation together with cyclical conditions. The high temperature is the most important factor which, together with cycle operation, gives rise to the thermal fatigue of the components. Thermal fatigue is caused by the temperature cycles, from room temperature to operation temperature, both in the starts and stops and during the moments of cloudiness. This type of cycle can cause premature failure of the receiver. Within the receiver-cavity system, the receiver component is particularly sensitive. The design of receiver tubes, incorporating thin walls and operating at even temperatures during the transient, usually has fewer problems with thermal fatigue. The long term creep of the material of the receiver and the oxidation are important considerations for choosing the materials. Chrome and nickel super alloys (Inconel®), stainless steels, titanium and nickel alloys, nickel and cobalt alloys, etc are commonly used.

There are numerous documents which develop different receivers or aspects of the same in the state of the art. Some of them are pointed out in the following:
  DE4433203 1996 HTC Solar Solar heater head for generation of electric current from solar energy. Absorber with highly conductive material and blackened (oxidized) to homogenize the heat concentration. Preferably copper material, which is welded to the tubes of the heat exchanger with high performance stainless steel (as a sleeve of the tube).
  US2002059798 2002 Midwest Research Institute Dish/stirling hybrid-receiver. Receiver hybrid system with sodium "heat pipe". Structure of the element made of nickel powder. It describes integration with burner system (hybrid).
  U.S. Pat. No. 6,735,946 2004 Boeing Direct illumination free piston stirling engine solar cavity. Directly illuminated piston. Without tube exchanger. Arrangement of small pistons concentrically to the solar beam. The receiver is a metallic element made of highly conductive material such as copper, nickel or graphite. An alternative to the design is to use "heat pipes".
  U.S. Pat. No. 6,739,136 2003 Boulder, Colo. Arvada, Colo. Combustion system for hybrid solar fossil fuel receiver. Combustion system for hybrid solar fossil fuel receiver comprising a premixer that combines air and fuel for forming the mixture to be burned. There is a heat exchanger associated to and in contact with the combustion chamber. This heat exchanger provides the heat for the hybrid receiver when the heat from the sun cannot be used as energy source.

U.S. Pat. No. 6,818,818 2004 Plano, Tex. Concentrating solar energy receiver. It describes a system consisting of a high reflectivity parabolic concentrator for reflecting the rays of the sun on its concave side and a conversion module that receives the concentrated solar radiation. In this conversion module, there are two different receivers; a photovoltaic receiver and a reception surface attached to a heat engine to produce electricity.

EP0996821 2000 STM Corporation Heat engine heater assembly. An equipment designed to use both solar radiation and the heat produced by the combustion of natural gas as a power source for a heat engine is described. A housing forming the receiver allows the input of solar radiation until reaching the absorber. Series of tubes external and internal to the receiver chamber absorb the solar radiation and transmit heat to the fluid flowing inside of it. A burner inside the chamber produces combustion gases that also heat up these tubes.

U.S. Pat. No. 4,665,700 1987 STM United Stirling AB Hot gas engine heater head. The object of the invention is to provide a heating head in which the regenerators are connected to the cylinders by tubes that surround these cylinders.

U.S. Pat. No. 4,602,614 1986 United Stirling, Inc. Hybrid solar/combustion powered receiver. It is an improved receiver which includes a heat exchanger inside the cavity with the tubes tangentially spaced. There are multiple burners to provide a path of the combustion gases and a window to seal the opening and so there are no gas leaks out of the receiver.

U.S. Pat. No. 6,668,555 2003 Boeing Company Solar receiver-based power generation system. This invention provides a design of improved solar receiver that reduces the cost of such mechanisms. The solar receiver includes a heat pipe that has a fluid inside of it. The heat pipe has two condenser parts arranged in two ends. Moreover, it includes an evaporator between both ends. An air collector is attached to one of the ends. This collector has an input and an output of air. A liquid collector is attached to the other end, with its respective input and output.

U.S. Pat. No. 4,911,144 1990 Stirling Thermal Engine, Inc Spherical solar energy collector. Invention relating to a collector for solar energy and in particular to one comprising an evaporator of a heat pipe-type heat transfer system U.S. Pat. No. 4,475,538 1984 United Stirling AB Window for solar receiver for a solar-powered hot gas engine. Solar receiver which includes a window for the entry of the solar radiation as an improvement.

CA2490207A1 2004 Shecs Labs—Solar Hydrogen Solar energy collector. The invention is a receiver with an internal cavity that reflects radiation. The receiver is contained in an inert or reducing atmosphere to maintain the properties of the reflective surfaces of the cavity. The heat absorption occurs in tubes arranged symmetrically with respect to the main axis of the receiver. In addition there is a quartz window in the input of the device to reduce losses by convection.

DE19527272: Solarer Erhitzer für Stirling-Motoren. Solar heater (1) for Stirling engine with a field of absorption (2) of parallel tubes (8), which are connected to two collectors (4, 5) through which the working gas circulates. The tubes (8) are identical to each other and have loop-shape geometry.

In view of the existing state of the art, the present invention aims to provide a solar receiver that, overcoming the deficiencies found in the previous designs:

increases the resistance to thermal fatigue,
minimizes the shadows between tubes,
has directly illuminated tubes, to simplify the system avoiding the inclusion of an intermediate heat transfer fluid and an additional heat exchanger as well as to make the optical design of the concentrator more flexible and that the engine can operate in other positions different than with the sun behind it,
does not leave gaps between the tubes when deforming by expansions, escaping the concentrated solar radiation through said gaps,
is easily weldable,
reduces head losses.

Thus, the new design allows to enhance the efficiency of the disc and to reduce the manufacturing, operation and maintenance costs. It also offers the possibility of:

easily refrigerating in the case of overheating (fan),
making the receiver independent from the cavity and the housing of the insulation that could cover it, to make it more versatile and facilitate the maintenance,
having the possibility of integrating a possible hybridization gas burner,
simplifying the manufacturing processes and facilitating the construction.

DESCRIPTION OF THE INVENTION

The invention consists of a new receiver for Stirling dish that complies with the requirements defined previously.

The designed receiver comprises the following components: tubes, collectors, tanks and cupolas.

Tubes: The tubes form the surface where the concentrated solar light beam falls. They are arranged very close to each other so that the surface has few gaps and the striking radiation can be maximized.

Collectors: The collectors are the areas where the tubes are welded such that the flow that runs through the tubes is communicated with the tanks.

Tanks: The tanks are the internal areas of the collectors; from here the working gas is distributed to each of the tubes.

Cupolas: There are two cupolas: the one for housing the regenerator (or heat exchanger capable of absorbing heat from the working gas, storing it and transferring it to the same to close the cycle and it is, of the exchangers that the engine contains, the one that handles a greater volume of thermal power) and the expansion cupola (or dome cupola), which is the area where the working gas is at a higher temperature.

The receiver design claimed in this invention, called concave model, is composed of a series of tubes emerging at right angles from a collector and arriving at right angles to the other. In this model there are two types of tubes slightly different from each other. Both types have a straight part running from the inside of each collector to the point where the tube starts to curve. The central part of each tube is a circumference arc. The only difference between the two types of tubes lies in the value of the radius of this circumference arc.

The curvature of the tubes allows the radiation that strikes from the solar concentrator to be distributed better over the entire surface of the tubes. According to the radiation maps taken on a plane, the greater intensity of radiation occurs in the centre of said plane. This model has the characteristic that the central part of the tubes is the furthest with respect to the plane of the collectors. As a result, the radiation peaks that occurred in the central part of the receiver are reduced. When the radiation is distributed in a better way, the temperature will also be distributed better throughout the tubes.

The curved shape of the tubes allows their expansion without creating excessive stress on the material. The receiver has some flexibility and the manufacture of the tubes is simple.

The collectors are placed so that the bonding surface with the tubes is perpendicular to them. If the surface formed by the tubes is observed from the direction in which the solar radiation strikes, the gap between a tube and the next one is the one required such that the distance between the welding points of the collectors is large enough to allow their manufacture.

The tubes of one type are column welded forming a vertical row of welding points in the collector, and this row is parallel to the row in which the tubes of the second type are placed.

The welding of the tubes to the collectors does not pose any problem since the distance between the holes or welding points of the collectors is sufficient to perform this operation easily.

With this design, there is no area of the tubes that is shaded by other tubes.

Therefore and in view of the simulations performed, it can be concluded that the overall performance of this model is much better than those known in the state of the art, since it efficiently distributes the stresses and deformations caused by the temperature since the tubes have more flexibility than what is known so far.

Another aspect that should be noted is that the contribution of the gas pressure to the stresses that the receiver must withstand is negligible with respect to the stresses caused by the high temperatures. It can be said that the designed model performs better than the previous ones against the thermal loads.

However, there are critical points to fatigue in the area of connection of the tubes to the collector since a flexible area (the tube) meets a much more rigid area (the collector). This poses a problem, since when the tube expands it is constrained by the rigidity of the collector and a point where the fracture due to fatigue may appear is created.

There are several solutions to this localized problem:
  To reduce the thickness of the area of connection of the tubes to increase the flexibility of the collector in that area.
  To place a sleeve or tube segment (by welding, sintering or other methods) on each of the tubes of the receiver in the area of connection to the collectors, which entails an increase of the thickness of the tubes in the weakest area, as well as a local stiffening of the junction, serving as a transition between the two areas with different rigidity.

In view of the results obtained for each of the two solutions adopted to improve the fatigue life it can be observed that the best solution a priori is the placement of the sleeve since the number of cycles that it withstands is increased by a factor of five with respect to the case without sleeve.

As for the manufacturing process of the receivers thus designed, it comprises the following steps:
  Receiving the tubes
  Bending of tubes
  Assembly of tubes to collector with furnace welding
  TIG Welding/plasma/laser for welding the tanks (made as junction of plates) to the collectors
  TIG Welding/plasma/laser for welding the cupolas (made from a block of material) to the tanks.

Therefore, the receiver model shown as well as its manufacturing process, comply with the design constraints and improve the overall thermo-mechanical behaviour of the receivers known of the state of the art.

DESCRIPTION OF THE DRAWINGS

To complete the description that is being made and in order to help to a better understanding of the invention, a set of drawings is accompanied where with illustrative character and without limitation, the following has been represented:

FIG. 1: Solar receiver from the state of the art. Patent DE19527272.

FIG. 2: Concave solar receiver. Plan, elevation and cross-section.

Figure 3:
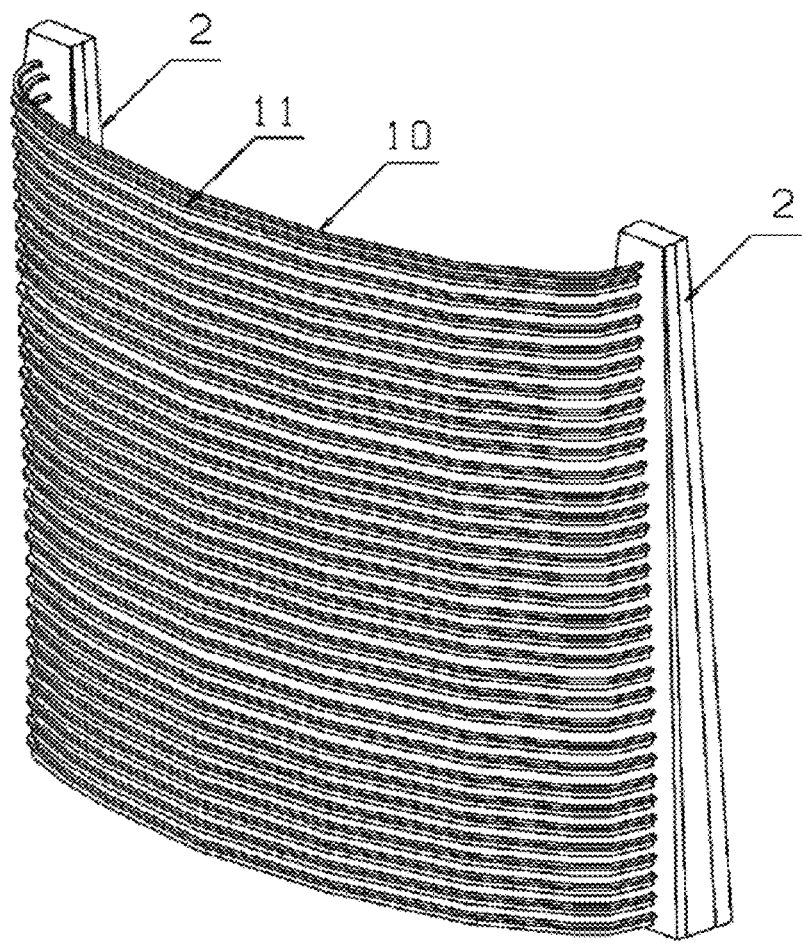
FIG. 3: Perspective view of the concave receiver

The elements alluded to by the references are:
1. Tubes
2. Collectors
3. Expansion or dome cupola
4. Cupola of the regenerator
10. Type 1 tubes
11. Type 2 tubes
12. Straight part of the tubes
13. Curved central part of the tube
20. Row of junction points of type 1 tubes to the collector
21. Row of junction points of type 2 tubes to the collector
22. Junction point or tube-collector welding

PREFERRED EMBODIMENT OF THE INVENTION

To achieve a better understanding of the invention, the new receiver design for Stirling dish will be described next according to a preferred embodiment.

FIG. 1 shows the design of a receiver from the state of the art, corresponding to patent DE19527272, in which it can be seen that said receiver is formed by the tubes (1), the collectors (2), the expansion or dome cupola (3) and the cupola which houses the regenerator (4). In this case the tubes (1) are identical to each other and have a loop-shaped geometry.

The claimed receiver, shown in FIGS. 2-5, features a design significantly different from the previous and complies with the following general features:
  Commercial materials used: nickel-chromium-based alloys (Inconel® 625 or Multimet®).
  Tubes to be used: outside diameter 3 mm. and thickness 0.5 mm.
  Collectors on 3 mm plate.

FIGS. 2 and 3 show the different views of the receiver. It is composed of a series of concave tubes (1) extending from one collector (2), perpendicular thereto, to the other collector (2), also perpendicular thereto. In this model there are two types of tubes (10, 11) slightly different from each other.

As shown in FIG. 3, the collectors (2) are rotated with respect to the vertical in such a way that the faces in which the welding of the tubes (10, 11) is carried out are not in front of each other.

Figure 4:
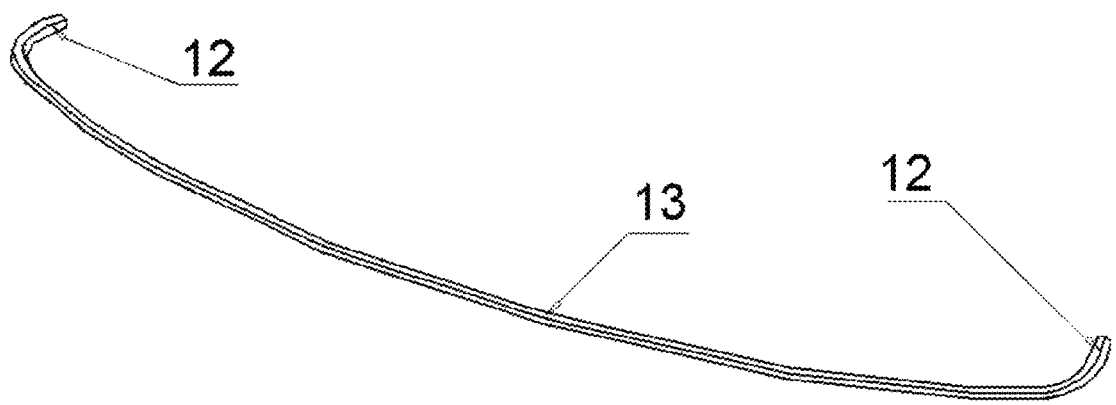
FIG. 4: Detail of the tubes

FIG. 4 shows the details. Both types of tubes (10, 11) having a straight part (12) of approx. 40 mm running from the inside of each collector to the point where the tube starts to curve. The central part (13) of each tube is a 40° circumference arc. The only difference between the two types of tubes (10, 11) lies in the value of the radius of this circumference (315 mm, 319 mm).

Figure 5:
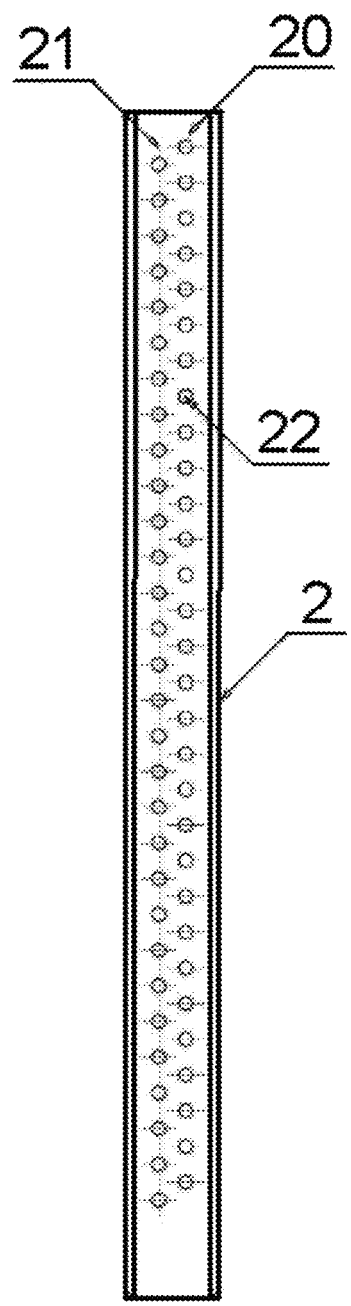
FIG. 5: Collector of the concave receiver

The collectors (2), as the one detailed in FIG. 5, are located so that the bonding surface with the tubes (1) is perpendicular to these (2). Thus, the plan view of FIG. 2 shows that the angle formed by the tubes (1) with the horizontal (ground horizontal lines shown in FIG. 2, elevation and plan) at the level of the welding, is 20°. In the same way, the angle formed by the collectors (2) and the horizontal will also be of 20°.

If the surface formed by the tubes (1) is observed from the direction in which the solar radiation strikes, the gap between a tube and the next one is 1.15 mm. These gaps have been included in the design so that the distance between welding points (22) of the collectors (2) is large enough to facilitate the welding operation.

FIG. 5 describes the junction points (22) of the tubes (1) to the collectors (2) and it is proven that the tubes of the type 1 (10) are placed in the same vertical row (20) of the collector (2), this row (20) being parallel to the row (21) formed by the tubes of the type 2 (11). The tubes of one row do not contact the tubes of the other row.

As explained above, there are critical points to fatigue, because since the tubes (10, 11) have a very flexible geometry in the area of connection of the tubes, a flexible area (the tube, 1) meets a much more rigid area (the collector, 2). This poses a problem, since when the tube (1) expands it is constrained by the rigidity of the collector (2) and a point where the fracture due to fatigue may appear is created.

To solve this localized problem a sleeve is placed on the critical point to serve as a transition between the two areas with different rigidities (not shown in the figures).

Therefore, this embodiment meets all the requirements of design and improves the efficiency of the system without increasing the cost.

Although this system is specially designed for application in Stirling dish receivers, its extension to other fields of the industry that require similar features is not excluded.

The invention claimed is:

1. A concave receiver for a Stirling dish, the receiver comprising:
    tubes, on the surface of which the concentrated solar light beam falls;
    collectors in which the ends of the tubes are welded and that place a fluid that runs through the tubes in communication with tanks which are the internal areas of the collectors and from which the working fluid is distributed to each of the tubes;
    a first cupola for housing a regenerator within the first cupola; and
    a second cupola which is an expansion cupola which is the area where the working fluid is at a higher temperature;
    wherein the tubes extend from one collector, perpendicular thereto, to the other collector, also perpendicular thereto, and each tube has a straight part running from the inside of each collector to a point where the tube starts to curve and a central part in the shape of an arc of a circumference;
    and wherein the tubes are attached to the collectors through welding points;
    and wherein if the surface formed by the tubes is observed from the direction in which the solar radiation strikes, the gap between a tube and the next tube is such that the distance between the welding points of the collectors is large enough to allow their welding operation.

2. The concave receiver for a Stirling dish according to claim 1 wherein the tubes do not have any area shaded by other tubes.

3. The concave receiver for a Stirling dish according to claim 1 wherein the straight part of the tubes has a length of about 40 mm and the central part of each tube is a circumference arc of 40°.

4. The concave receiver for a Stirling dish according to claim 1 wherein the angle formed by the tubes with the horizontal at the level of the welding, is 20° and the angle formed by the collectors and the horizontal is also 20°.

5. The concave receiver for a Stirling dish according to claim 1 wherein the gap between a tube and the next tube is 1.15 mm.

6. A concave receiver for a Stirling dish, the receiver comprising:
    tubes, on the surface of which the concentrated solar light beam falls;
    collectors in which the ends of the tubes are welded and that place a fluid that runs through the tubes in communication with tanks which are the internal areas of the collectors and from which the working fluid is distributed to each of the tubes;
    a first cupola for housing a regenerator within the first cupola; and
    a second cupola which is an expansion cupola which is the area where the working fluid is at a higher temperature;
    wherein the tubes extend from one collector, perpendicular thereto, to the other collector, also perpendicular thereto, and each tube has a straight part running from the inside of each collector to a soint where the tube starts to curve and a central part in the shape of an arc of a circumference;
    and wherein there are two types of tubes and the only difference between the two types is the value of the radius of the central circumference arc.

7. The concave receiver for a Stirling dish according to claim 6 wherein the first type of tubes have a radius of the arc of the circumference of 315 mm and the second type of 319 mm.

8. The concave receiver for a Stirling dish according to claim 6 wherein the tubes of one type are column welded to the collector forming a vertical row of welding points, and this row is parallel to the row of welding points in which the tubes of the second type are welded to the collector.

9. The concave receiver for a Stirling dish according to claim 1 wherein the tubes and collectors are made of nickel-chromium-based alloys.

10. The concave receiver for a Stirling dish according to claim 1 wherein the tubes to be used have an outside diameter of 3 mm and a thickness of 0.5 mm and the collectors are made of a 3 mm plate.

11. The concave receiver for a Stirling dish according to claim 1 wherein a sleeve or tube segment is attached by welding, sintering or other methods to each of the tubes of the receiver in the area of connection with the collectors, serving as a transition between the two areas with different rigidity.

12. A method for manufacturing the concave receiver for a Stirling dish described in claim 1, the method comprising the following steps:
    receiving a plurality of tubes;
    bending the tubes such that each tube has a straight portion at each end and a central portion that is an arc of a circumference;
    assembling the tubes to two collectors, one collector at each end of the tubes, the tubes and collectors being joined with furnace welding, wherein the tubes are attached to the collectors through welding points, and wherein if the surface formed by the tubes is observed from the direction in which the solar radiation strikes, the gap between a tube and the next tube is such that the distance between the welding points of the collectors is large enough to allow their welding operation;

welding plates to the collectors to form tanks in the interior of the collectors, the welding of the plates to the collectors being performed by TIG, plasma, or laser welding; and welding two cupolas to the tanks, one cupola at a tank of each collector, wherein each cupola is made from a block of material, and wherein the welding of the cupolas to the tanks is performed by TIG, plasma, or laser weldin.

13. The method of claim 12, wherein a first group of the tubes have a first radius of the arc, and a second group of the tubes have a second radius of the arc.

14. The method of claim 12, wherein the weld points of the tubes to the collectors form two parallel staggered rows on each of the collectors, the first group of the tubes being connected in one of the parallel rows and the second group of the tubes being connected in the other of the parallel rows, such that the tubes form a two-layered cylindrical surface on which concentrated solar radiation falls during operation of the receiver.

* * * * *